United States Patent
Azmoon

(10) Patent No.: US 10,540,082 B2
(45) Date of Patent: *Jan. 21, 2020

(54) TUTORIAL TIMELINE CHOOSER

(71) Applicant: ServiceNow, Inc., Santa Clara, CA (US)

(72) Inventor: Troy Azmoon, Carlsbad, CA (US)

(73) Assignee: ServiceNow, Inc., Santa Clara, CA (US)

( * ) Notice: Subject to any disclaimer, the term of this patent is extended or adjusted under 35 U.S.C. 154(b) by 33 days.

This patent is subject to a terminal disclaimer.

(21) Appl. No.: 16/017,745

(22) Filed: Jun. 25, 2018

(65) Prior Publication Data
US 2018/0307404 A1    Oct. 25, 2018

Related U.S. Application Data

(63) Continuation of application No. 14/985,893, filed on Dec. 31, 2015, now Pat. No. 10,007,414.

(60) Provisional application No. 62/098,511, filed on Dec. 31, 2014.

(51) Int. Cl.
G06F 3/0484    (2013.01)
G06F 3/0485    (2013.01)

(52) U.S. Cl.
CPC ................... G06F 3/04855 (2013.01)

(58) Field of Classification Search
None
See application file for complete search history.

(56) References Cited

U.S. PATENT DOCUMENTS

| | | | |
|---|---|---|---|
| 3,141,243 A | 7/1964 | Chapman et al. | |
| 3,371,321 A | 2/1968 | Adams | |
| 5,577,186 A | 11/1996 | Mann, II et al. | |
| 6,612,842 B2 | 9/2003 | Wen et al. | |
| 6,692,256 B2 | 2/2004 | Chan et al. | |
| 6,909,874 B2 | 6/2005 | Holtz et al. | |
| 7,062,220 B2 | 6/2006 | Haynes et al. | |
| 7,065,512 B1 | 6/2006 | Bertrand et al. | |
| 7,878,808 B1 | 2/2011 | Stumm et al. | |
| 8,719,174 B2 | 5/2014 | Peters et al. | |
| 2007/0288247 A1* | 12/2007 | Mackay | G06Q 10/00 705/1.1 |

(Continued)

FOREIGN PATENT DOCUMENTS

WO    1998022864    5/1998
WO    2014042571 A1    3/2014

Primary Examiner — Tuan S Nguyen
(74) Attorney, Agent, or Firm — Fletcher Yoder PC

(57) ABSTRACT

Systems, apparatuses, and methods for displaying a tutorial timeline chooser are disclosed. Displaying a tutorial timeline chooser may include generating an output for display, the output including a representation of a tutorial subject, wherein a tutorial associated with the tutorial subject includes a sequence of tutorial units, the output for display including a first portion including the representation of the tutorial subject, and a second portion including a tutorial timeline chooser for controlling the tutorial, wherein the tutorial timeline chooser includes a tutorial timeline and a plurality of tutorial segment indicators, wherein each tutorial segment indicator from the plurality of tutorial segment indicators corresponds with a respective tutorial unit from the sequence tutorial units, and transmitting or storing the output for display.

20 Claims, 10 Drawing Sheets

(56) References Cited

U.S. PATENT DOCUMENTS

| | | |
|---|---|---|
| 2008/0096174 A1 | 4/2008 | Bodlaender et al. |
| 2009/0098524 A1 | 4/2009 | Walton |
| 2011/0225494 A1 | 9/2011 | Shmuylovich et al. |
| 2012/0323891 A1* | 12/2012 | Jacobson ............... G06F 16/43 707/722 |
| 2013/0086501 A1* | 4/2013 | Chow ............... G06F 16/2477 715/772 |
| 2015/0347944 A1* | 12/2015 | Aparimit .......... G06Q 10/06313 705/7.23 |

* cited by examiner

US 10,540,082 B2

TUTORIAL TIMELINE CHOOSER

CROSS-REFERENCE TO RELATED APPLICATIONS

This application is a continuation of and claims priority to U.S. patent application Ser. No. 14/985,893, entitled "TUTORIAL TIMELINE CHOOSER," filed on Dec. 31, 2015, which claims priority to U.S. Provisional Patent Application No. 62/098,511, filed Dec. 31, 2014, entitled "TUTORIAL TIMELINE CHOOSER," which are herein incorporated by reference.

TECHNICAL FIELD

The present disclosure relates in general to techniques and devices for controlling tutorials and in particular for controlling a tutorial for a graphical interface in a cloud computing system.

BACKGROUND

A tutorial for a graphical interface may include a sequence of tutorial portions. Accordingly, a tutorial timeline chooser would be advantageous.

SUMMARY

One aspect of the disclosure is an apparatus or method for operating a window region of a graphical user interface (GUI) associated with a computer-based tutorial system, comprising a processor configured to execute instructions stored in a memory, the instructions comprising a tutorial timeline module that generates a tutorial output for display, the tutorial output comprising a graphical representation of a tutorial subject in a tutorial display region of the GUI, wherein a tutorial associated with the tutorial subject includes a sequence of tutorial units stored in a memory associated with the processor, an output module that transmits the tutorial output via a GUI output interface or stores the tutorial output in the memory, the tutorial timeline module generates an updated tutorial output in response to user input signals provided via a GUI input interface, the updated tutorial output comprising a first portion comprising the graphical representation of the tutorial subject, and a second portion comprising a graphical tutorial timeline chooser for controlling the tutorial, wherein the graphical tutorial timeline chooser comprises a tutorial timeline display region and a plurality of tutorial segment indicator display regions, each tutorial segment indicator display region from the plurality of tutorial segment indicator display regions corresponds with a respective tutorial unit from the sequence of tutorial units, and the output module transmits the updated tutorial output via the GUI output interface or stores the tutorial output in the memory.

Another aspect of the disclosure is an apparatus or method for operating a window region of a graphical user interface (GUI) associated with a computer-based tutorial system, comprising a processor configured to execute instructions stored in a memory to generate an output for display, the output comprising a representation of a tutorial subject, wherein a tutorial associated with the tutorial subject includes a sequence of tutorial units, transmit or store the output for display, generate an updated output in response to user input, the updated output comprising a first portion including the representation of the tutorial subject, and a second portion including a tutorial timeline chooser for controlling the tutorial, wherein the tutorial timeline chooser comprises a tutorial timeline and a plurality of tutorial segment indicators, wherein each tutorial segment indicator from the plurality of tutorial segment indicators corresponds with a respective tutorial unit from the sequence tutorial units, wherein generating the updated output comprises identifying a current state of the tutorial timeline chooser, wherein the current state indicates a first subset of tutorial units, from the sequence of tutorial units, that is currently included in the output for display, and a second subset of tutorial units, from the sequence of tutorial units, that is currently omitted from the output for display, and transmit or store the updated output as the output for display.

Another aspect of the disclosure is an apparatus or method for operating a window region of a graphical user interface (GUI) associated with a computer-based tutorial system, comprising generating, using a processor, a tutorial output for display on a display device, the tutorial output comprising a representation of a tutorial subject, wherein a tutorial associated with the tutorial subject comprises a sequence of tutorial units stored in a memory accessible by the processor, transmitting via a GUI output interface or storing in the memory the tutorial output for the display, generating an updated tutorial output in response to user input entered at a GUI input interface, the updated tutorial output comprising a first portion comprising the representation of the tutorial subject, and a second portion including a tutorial timeline chooser for controlling the tutorial, wherein the tutorial timeline chooser comprises a tutorial timeline and a plurality of tutorial segment indicators, wherein each tutorial segment indicator from the plurality of tutorial segment indicators corresponds with a respective tutorial unit from the sequence of tutorial units, wherein generating the updated tutorial output comprises identifying a current state of the tutorial timeline chooser, wherein the current state indicates a first subset of tutorial units from the sequence of tutorial units that is currently included in the tutorial output for display, and a second subset of tutorial units from the sequence of tutorial units that is currently omitted from the output for display, and wherein the user input indicates a selection of a target tutorial segment identifier corresponding to a target tutorial unit from the second subset, updating a characteristic of the target tutorial segment identifier to indicate that the target tutorial unit is included in the tutorial output for display, on a condition that the first subset includes a tutorial unit, updating a control included in a sequentially last tutorial unit from the first subset, such that selection of the control indicates a request to close the corresponding tutorial unit, wherein the second subset includes a tutorial unit sequentially preceding the target tutorial unit, and wherein including the target tutorial unit in the updated output includes omitting the tutorial unit from the second subset sequentially preceding the target tutorial unit, and including the target tutorial unit in the updated output, and transmitting via the GUI output interface or storing in the memory the updated tutorial output for the display.

BRIEF DESCRIPTION OF THE DRAWINGS

The description herein makes reference to the accompanying drawings wherein like reference numerals refer to like parts throughout the several views.

DETAILED DESCRIPTION

A tutorial, or help system, may provide information describing or explaining a feature or function of an aspect or element within a defined context or subject, such as a user interface for an aspect of a cloud computing system. In some implementations, a tutorial may be organized as an ordered sequence of tutorial units, steps, or stages. A user may navigate through a tutorial by progressing through each tutorial unit in sequence. However, navigating through the tutorial sequentially may be inefficient.

A tutorial timeline chooser may represent the sequence of tutorial units for a tutorial using a corresponding sequence of tutorial stage indicators positioned along a tutorial timeline, which may represent the tutorial as a continuum, such as a line from left to right. In response to user input signals, a tutorial timeline chooser may control the tutorial to display none of the tutorial units or all of the tutorial units. A tutorial timeline chooser may control the tutorial to display the tutorial units in sequence, or independently of sequence, in response to user input signals. For example, a tutorial timeline chooser may control the tutorial to display target tutorial units, in any order, in response to user input signals selecting the corresponding tutorial stage indicators.

Figure 1:
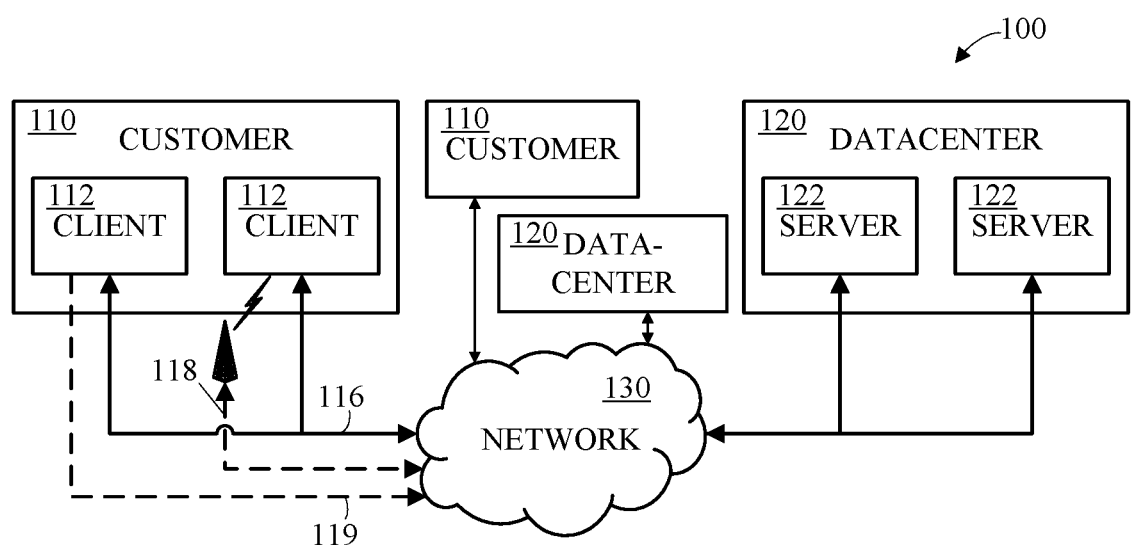
FIG. 1 is a block diagram of a networked distributed or cloud computing system in which the teachings herein may be implemented.

FIG. 1 is a block diagram of a distributed (e.g., client-server, networked, or cloud) computing system 100. Use of the phrase "cloud computing system" herein is a proxy for any form of a distributed computing system, and this phrase is used simply for ease of reference. Cloud computing system 100 can have any number of customers, including customer 110. Each customer 110 may have clients, such as clients 112. Each of clients 112 can be in the form of a computing system including multiple computing devices, or in the form of a single computing device, for example, a mobile phone, a tablet computer, a laptop computer, a notebook computer, a desktop computer, and the like. Customer 110 and clients 112 are examples only, and a cloud computing system may have a different number of customers or clients or may have a different configuration of customers or clients. For example, there may be hundreds or thousands of customers and each customer may have any number of clients. Customers and clients may be described more generally as respective user entities/groups and end users.

Cloud computing system 100 can include any number of datacenters, including datacenter 120. Each datacenter 120 may have servers, such as servers 122. Each datacenter 120 may represent a facility in a different geographic location where servers are located. Each of servers 122 can be in the form of a computing system including multiple computing devices, or in the form of a single computing device, for example, a desktop computer, a server computer and the like. The datacenter 120 and servers 122 are examples only, and a cloud computing system may have a different number of datacenters and servers or may have a different configuration of datacenters and servers. For example, there may be tens of data centers and each data center may have hundreds or any number of servers.

Clients 112 and servers 122 may be configured to connect to network 130. The clients for a particular customer may connect to network 130 via a common connection point 116 or different connection points, e.g. a wireless connection point 118 and a wired connection point 119. Any combination of common or different connections points may be present, and any combination of wired and wireless connection points may be present as well. Network 130 can be, for example, the Internet. Network 130 can also be or include a local area network (LAN), wide area network (WAN), virtual private network (VPN), or any other means of transferring data between any of clients 112 and servers 122. Network 130, datacenter 120 and/or blocks not shown may include network hardware such as routers, switches, load balancers and/or other network devices.

Other implementations of the cloud computing system 100 are also possible. For example, devices other than the clients and servers shown may be included in system 100. In an implementation, one or more additional servers may operate as a cloud infrastructure control, from which servers and/or clients of the cloud infrastructure are monitored, controlled and/or configured. For example, some or all of the techniques described herein may operate on said cloud infrastructure control servers. Alternatively, or in addition, some or all of the techniques described herein may operate on servers such as servers 122.

Figure 2:
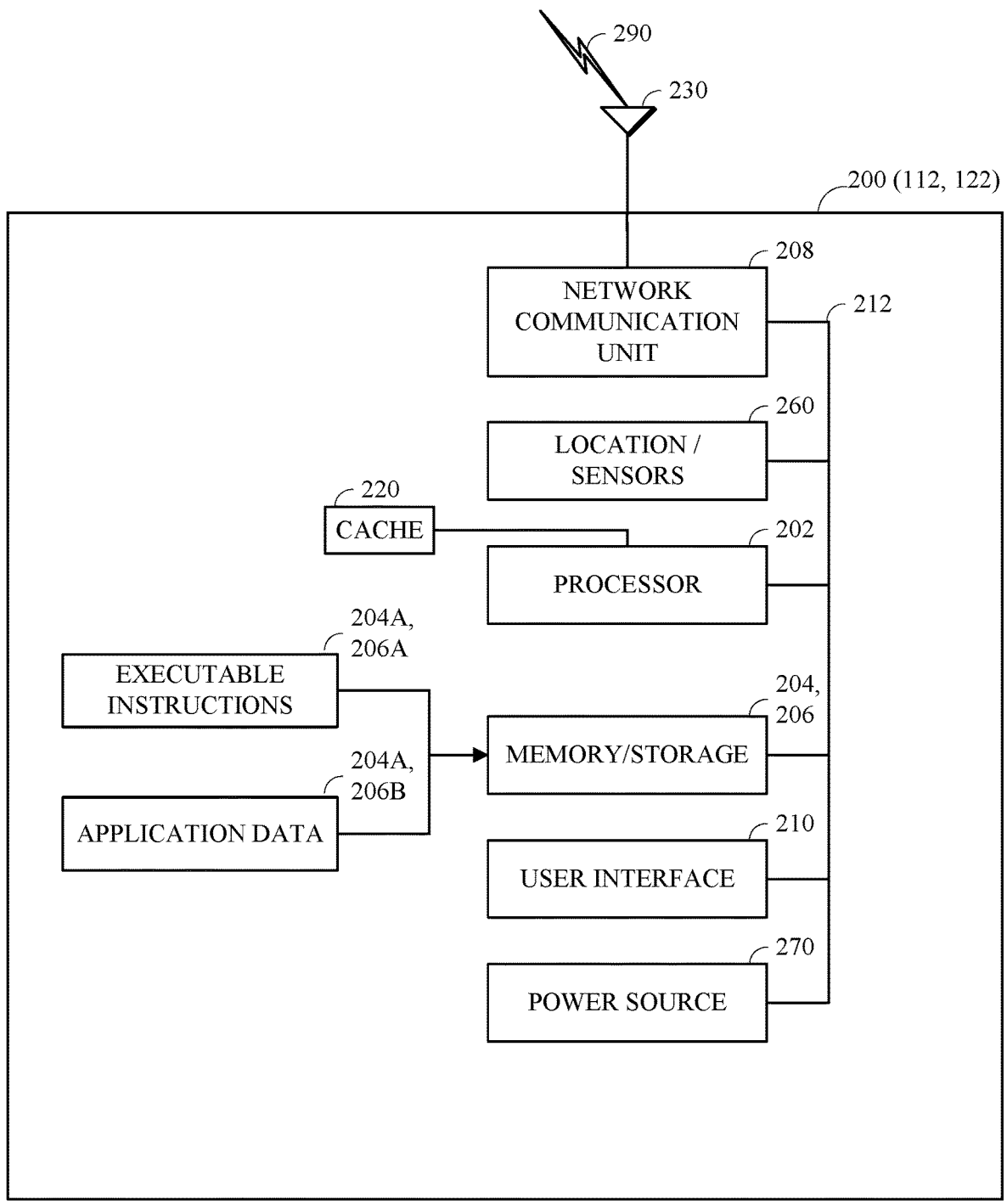
FIG. 2 is a block diagram of an example internal configuration of a computing device, such as a computing device of the computing system as shown in FIG. 1.

FIG. 2 is a block diagram of an example internal configuration of a computing device 200, such as a client 112 or server device 122 of the computing system 100 as shown in FIG. 1, including an infrastructure control server, of a computing system. As previously described, clients 112 or servers 122 may take the form of a computing system including multiple computing units, or in the form of a single computing unit, for example, a mobile phone, a tablet computer, a laptop computer, a notebook computer, a desktop computer, a server computer and the like.

The computing device 200 can include a number of components, as illustrated in FIG. 2. CPU (or processor) 202 can be a central processing unit, such as a microprocessor, and can include single or multiple processors, each having single or multiple processing cores. Alternatively, CPU 202 can include another type of device, or multiple devices, capable of manipulating or processing information now-existing or hereafter developed. When multiple processing devices are present, they may be interconnected in any manner, including hardwired or networked, including wirelessly networked. Thus, the operations of CPU 202 can be distributed across multiple machines that can be coupled directly or across a local area or other network The CPU 202 can be a general purpose processor or a special purpose processor.

Random Access Memory (RAM 204) can be any suitable non-permanent storage device that is used as memory. RAM 204 can include executable instructions and data for immediate access by CPU 202. RAM 204 typically comprises one or more DRAM modules such as DDR SDRAM. Alternatively, RAM 204 can include another type of device, or multiple devices, capable of storing data for processing by CPU 202 now-existing or hereafter developed. CPU 202 can access and manipulate data in RAM 204 via bus 212. The CPU 202 may utilize a cache 220 as a form of localized fast memory for operating on data and instructions.

Storage 206 can be in the form of read only memory (ROM), a disk drive, a solid state drive, flash memory, Phase-Change Memory (PCM), or any form of non-volatile memory designed to maintain data for some duration of time, and preferably in the event of a power loss. Storage 206 can include executable instructions 206A and application files/data 206B along with other data. The executable instructions 206A can include, for example, an operating system and one or more application programs for loading in whole or part into RAM 204 (with RAM-based executable instructions 204A and application files/data 204B) and to be executed by CPU 202. The executable instructions 206A may be organized into programmable modules or algorithms, functional programs, codes, and code segments designed to perform various functions described herein.

The term module, as used herein, can be implemented using hardware, software, or a combination thereof. A module may form a part of a larger entity, and may itself be broken into sub-entities. When a module is implemented using software, this software can be implemented as algorithmic components comprising program instructions stored in a memory, the instructions designed to be executed on a processor. The term "module" does not require any specific form of coding structure, and functional aspects of different modules may be independent but also may overlap and be performed by common program instructions. For example, a first module and a second module may be implemented using a common set of program instructions without distinct boundaries between the respective and/or common instructions that implement the first and second modules.

The operating system can be, for example, a Microsoft Windows®, Mac OS X®, or Linux®, or operating system, or can be an operating system for a small device, such as a smart phone or tablet device, or a large device, such as a mainframe computer. The application program can include, for example, a web browser, web server and/or database server. Application files 206B can, for example, include user files, database catalogs and configuration information. In an implementation, storage 206 includes instructions to perform the discovery techniques described herein. Storage 206 may comprise one or multiple devices and may utilize one or more types of storage, such as solid state or magnetic.

The computing device 200 can also include one or more input/output devices, such as a network communication unit 208 and interface 230 that may have a wired communication component or a wireless communications component 290, which can be coupled to CPU 202 via bus 212. The network communication unit 208 can utilized any of a variety of standardized network protocols, such as Ethernet, TCP/IP, to name a few of many protocols, to effect communications between devices. The interface 230 can comprise one or more transceiver(s) that utilize the Ethernet, power line communication (PLC), WiFi, infrared, GPRS/GSM, CDMA, etc.

A user interface 210 can include a display, positional input device (such as a mouse, touchpad, touchscreen, or the like), keyboard, or other forms of user input and output devices. The user interface 210 can be coupled to the processor 202 via the bus 212. A graphical user interface (GUI) 210 is specifically a user interface that allows people to interact with a device in a graphical. It can be broken down into an input portion, an output portion, and a processor that manages, process, and interacts with the input and output portions. The input portion can accept input created by elements such as a mouse, touchpad, touchscreen, or the like. The output portion of a GUI can generate input displayable on some form of a display, such as a cathode-ray tube (CRT), liquid crystal display (LCD), and light emitting diode (LED) display, such as an organic light emitting diode (OLED) display. The display is generally formed of a grid of pixels, each of which can take on various illumination and optionally color values that are grouped together and arranged to form various higher-level entities (in pixel regions) on the display. These pixel regions can make up icons, windows, buttons, cursors, control elements, text, and other displayable entities. The display utilizes graphical device interface that typically comprises a graphics processor specifically designed to interact with the hardware of the display, and may accept high-level instructions from other processors to reduce demands on them. The graphical device interface typically has its own memory that serves as a buffer and also allows manipulation of stored data by the graphics processor. Operation of the display thus typically involves the graphics processor accessing instructions and data stored memory to modify pixel regions on the display for the user.

Other implementations of the internal configuration or architecture of clients and servers 200 are also possible. For example, servers may omit display 210. RAM 204 or storage 206 can be distributed across multiple machines such as network-based memory or memory in multiple machines performing the operations of clients or servers. Although depicted here as a single bus, bus 212 can be composed of multiple buses, that may be connected to each other through various bridges, controllers, and/or adapters. Computing devices 200 may contain any number of sensors and detectors that monitor the device 200 itself or the environment around the device 200, or it may contain a location identification unit 260, such as a GPS or other type of location device. The computing device 200 may also contain a power source 270, such as a battery, so that the unit can operate in a self-contained manner. These may communicate with the CPU/processor 202 via the bus 212.

A tutorial, or help system, may provide information describing or explaining a feature or function of an aspect or element within a defined context or subject. For example, a tutorial may provide information describing an aspect of a cloud computing system, such as a user interface. A tutorial may be integrated within the context the tutorial describes. For example, a tutorial may describe a user interface, and the tutorial may be integrated into the user interface. In some implementations, a tutorial may be organized as an ordered sequence of tutorial units, steps, or stages. For simplicity and clarity, the description herein describes a tutorial timeline chooser in relation to a visual task board; however, a tutorial timeline chooser may be used in conjunction with any context. The tutorial shown in FIGS. 3A-3G includes four units; however, any number of units may be used.

Figure 3A:
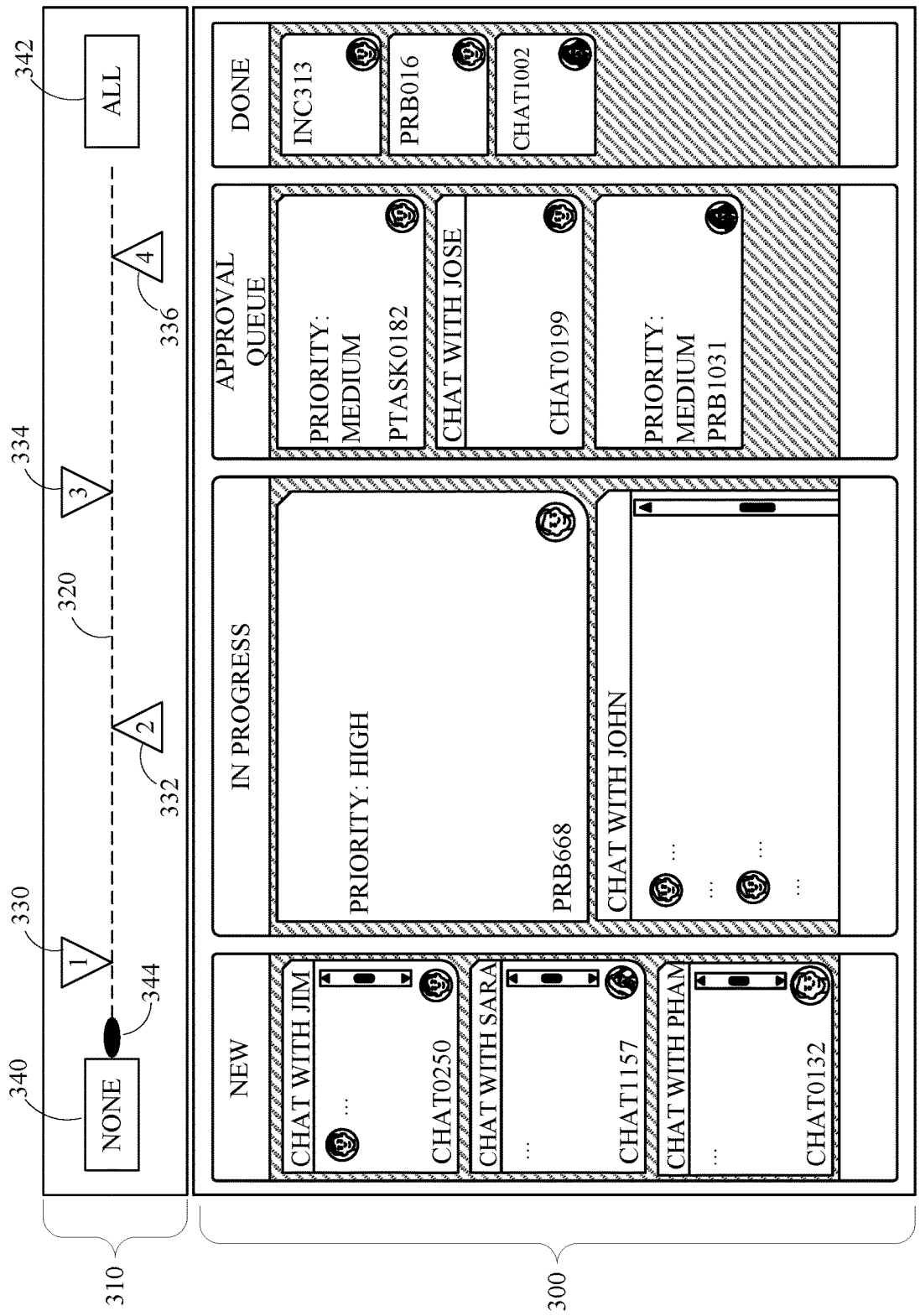
FIGS. 3A-3G are pictorial diagrams showing examples of a timeline tutorial chooser in accordance with this disclosure.

FIG. 3A is a pictorial diagram that shows an example of a timeline tutorial chooser in accordance with this disclosure. The example shown in FIG. 3A includes a context portion 300, and a tutorial timeline chooser portion 310. Although the tutorial timeline chooser portion 310 is shown horizontally left to right above the context portion 300 in FIGS. 3A-3G, the tutorial timeline chooser portion may be included in any position, such as below the context portion, to the left of the context portion, or to the right of the context portion, and in any orientation, such as right to left, top to bottom, or bottom to top. As shown, the context portion 300 includes a portion of a visual task board as an example. A tutorial timeline chooser may include a tutorial timeline 320, tutorial stage indicators 330-336, tutorial controls 340-344, or a combination thereof.

The tutorial timeline 320 may represent the tutorial as a continuum, from left to right. Each tutorial stage indicator 330-336 may represent a respective tutorial unit, and may be positioned along the tutorial timeline 320 in sequential order, from left to right. For example, the first tutorial stage indicator 330 may correspond with a first unit of the tutorial, and may be positioned near the left end of the tutorial timeline 320. The second tutorial stage indicator 332 may correspond with a second unit of the tutorial, and may be positioned to the right of the first stage indicator 330. The third tutorial stage indicator 334 may correspond with a third unit of the tutorial, and may be positioned to the right of the second stage indicator 332. The fourth tutorial stage indicator 336 may correspond with a fourth unit of the tutorial, and may be positioned to the right of the third stage indicator 334, near the right end of the tutorial timeline 320. As shown, the timeline tutorial chooser portion 310 includes a show none control 340 to the left of the tutorial timeline 320, a show all control 342 to the right of the tutorial timeline 320, and a slider control 344 to the at the left end of the tutorial timeline 320. In some aspects, the tutorial units of the tutorial may be hidden or omitted from display, as shown in FIG. 3A.

In some aspects, the tutorial timeline 320 may indicate whether one or more of the tutorial units is currently included in the output for display, was previously included in the output for display, or a combination thereof. For example, a visual element of one or more portions of the tutorial timeline 320, such as a line type, color, or weight, may indicate a corresponding tutorial unit, or units, is currently included in the output for display, was previously included in the output for display, or a combination thereof. In FIG. 3A, the tutorial timeline 320 is shown as a broken line to indicate that the tutorial units are omitted from the output for display.

Figure 3B:
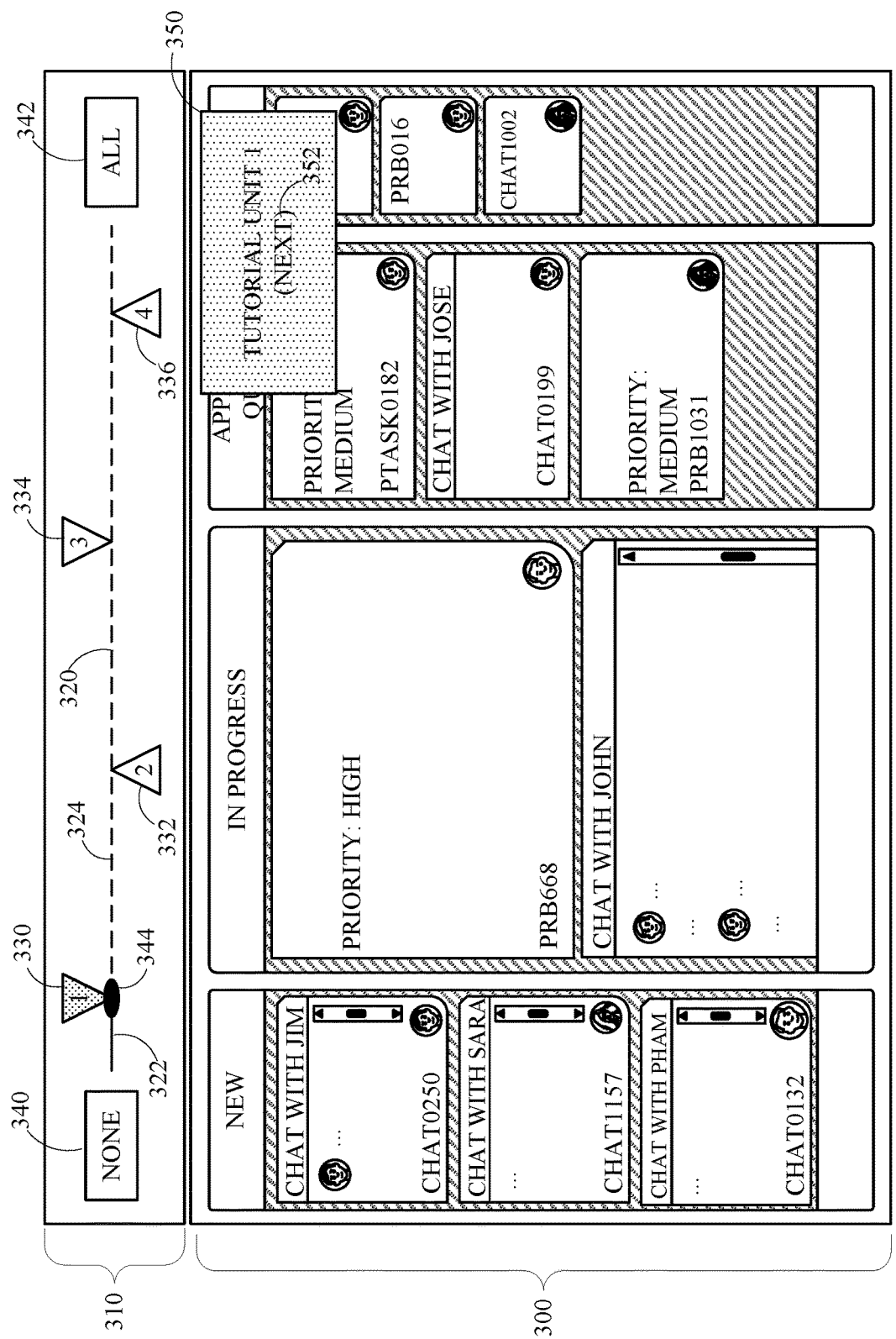

FIG. 3B is a pictorial diagram that shows another example of a timeline tutorial chooser in accordance with this disclosure. The example shown in FIG. 3B is similar to the example shown in FIG. 3A, except as described herein. In some aspects, one or more of the tutorial units may be shown or included in the tutorial. In FIG. 3B, the first tutorial unit 350 is included in the tutorial. Including a tutorial unit in the tutorial may include generating output for display including a representation of the tutorial unit superimposed over context. In FIG. 3B, the first tutorial unit 350 is shown superimposed over a portion of the visual task board.

The tutorial unit indicators 330-336 may indicate whether the corresponding tutorial unit is included in the tutorial output for display. For example, a visual element, such as a background color, of a tutorial unit indicator that represents a tutorial unit that is included in the output for display may differ from the corresponding visual element of a tutorial unit indicator that represents a tutorial unit that is omitted from the output for display. In FIG. 3B, the first tutorial unit indicator 330 is shown with a stippled background to indicate that the first tutorial unit is included. In FIG. 3B, a first portion 322 of the tutorial timeline 320 is shown as a thick solid line to indicate that the first tutorial unit is included in the output for display, and a second portion 324 of the tutorial timeline 320 is shown as a broken line to indicate that the second, third, and fourth tutorial units are omitted from the output for display.

In some aspects, a tutorial unit may be included in the output for display in response to input, such as user input signals from a GUI. For example, the first tutorial unit 350 may be included in the output for display in response to user input dragging the slider control 344 to a position along the tutorial timeline 320 corresponding to the first tutorial unit indicator 330, as shown. In another example, the first tutorial unit 350 may be included in the output for display in response to user input clicking or tapping on the first tutorial unit indicator 330. In some implementations, the first tutorial unit 350 may be included in the output for display in response to starting or opening the tutorial.

In some aspects, including a tutorial unit in the output for display may include automatically updating the position of the slider control 344 to indicate the current, or most recently included, tutorial unit. For example, the first tutorial unit 350 may be included in the output for display, and the position of the slider control 344 may be automatically updated to correspond with the first tutorial unit indicator 330, in response to user input clicking on the first tutorial unit indicator 330.

In some aspects, including a tutorial unit in the output for display may include automatically updating a visual element of one or more portions of the tutorial timeline 320 to indicate the current, or most recently included, tutorial unit. For example, the first tutorial unit 350 may be included in the output for display, a visual element, such as line weight, color, or type, of the first portion 322 of the tutorial timeline 320 may be automatically updated.

In some implementations, a tutorial unit may include one or more controls. For example, in FIG. 3B, the first tutorial unit 350 includes a "Next" control 352. In some aspects, a tutorial unit may be included in the output for display in response to input, such as user input, advancing the tutorial. For example, the timeline tutorial chooser may receive information indicating user input clicking or tapping on a control, such as the "Next" control 352, and a subsequent tutorial unit may be included in the output for display as shown in FIG. 3C.

Figure 3C:
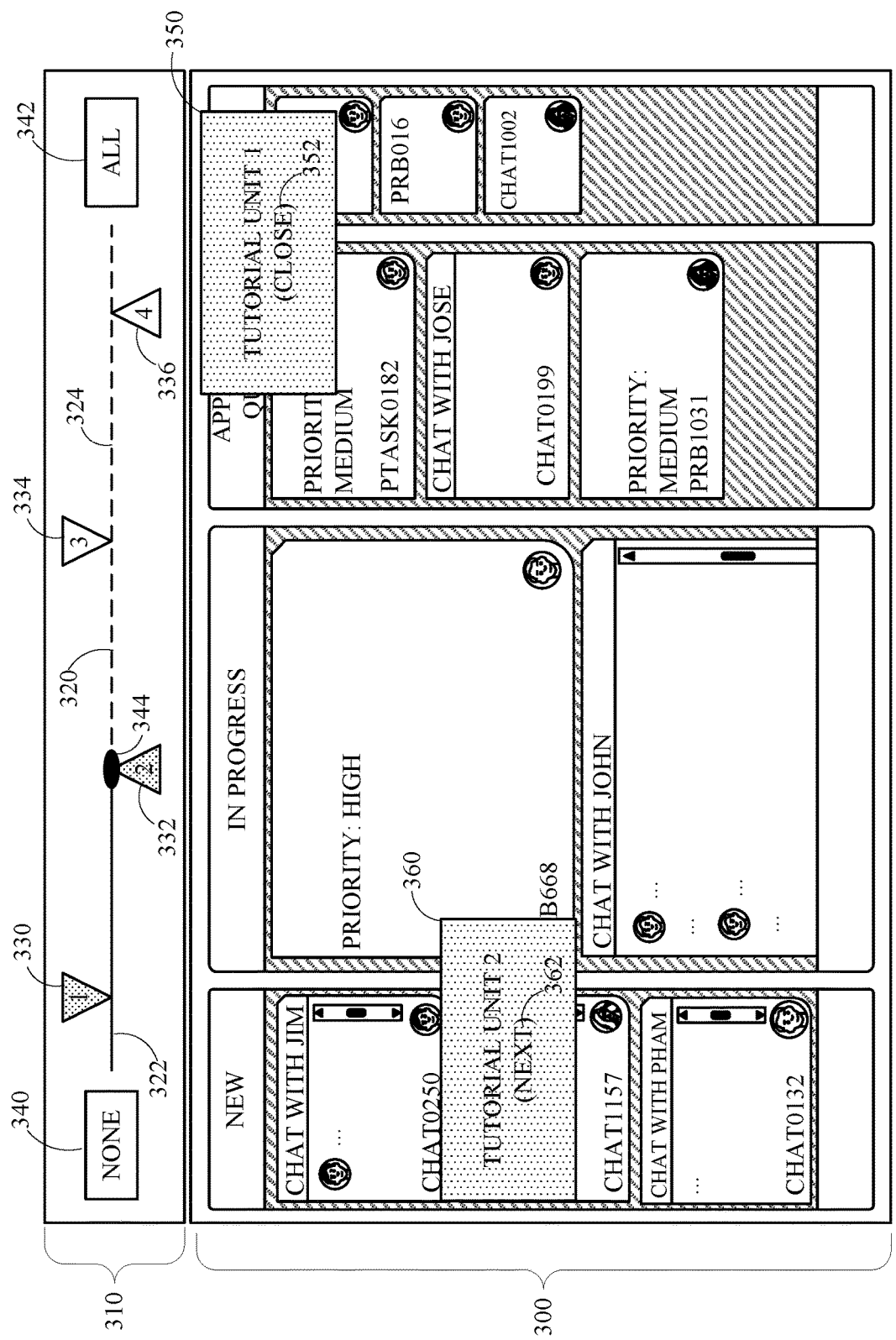

FIG. 3C is a pictorial diagram that shows another example of a timeline tutorial chooser in accordance with this disclosure. The example shown in FIG. 3C is similar to the example shown in FIG. 3B, except as described herein. In FIG. 3C, the second tutorial unit 360 is included in the output for display, the second tutorial unit indicator 332 indicates that the second tutorial unit 360 is included in the output for display, the position of the slider control 344 indicates that the second tutorial unit 360 is included in the output for display, and the first portion 322 of the tutorial timeline 320, which is shown as a thick solid line, indicates that the second tutorial unit 360 is included in the output for display. The second tutorial unit 360 includes a "Next" control 362.

In some aspects, including a tutorial unit in the output for display may include automatically updating another tutorial unit, or a portion thereof. For example, the control 352 included in the first tutorial unit 350 may be updated from a "Next" control, as shown in FIG. 3B, to a "Close" control as shown in FIG. 3C.

Figure 3D:
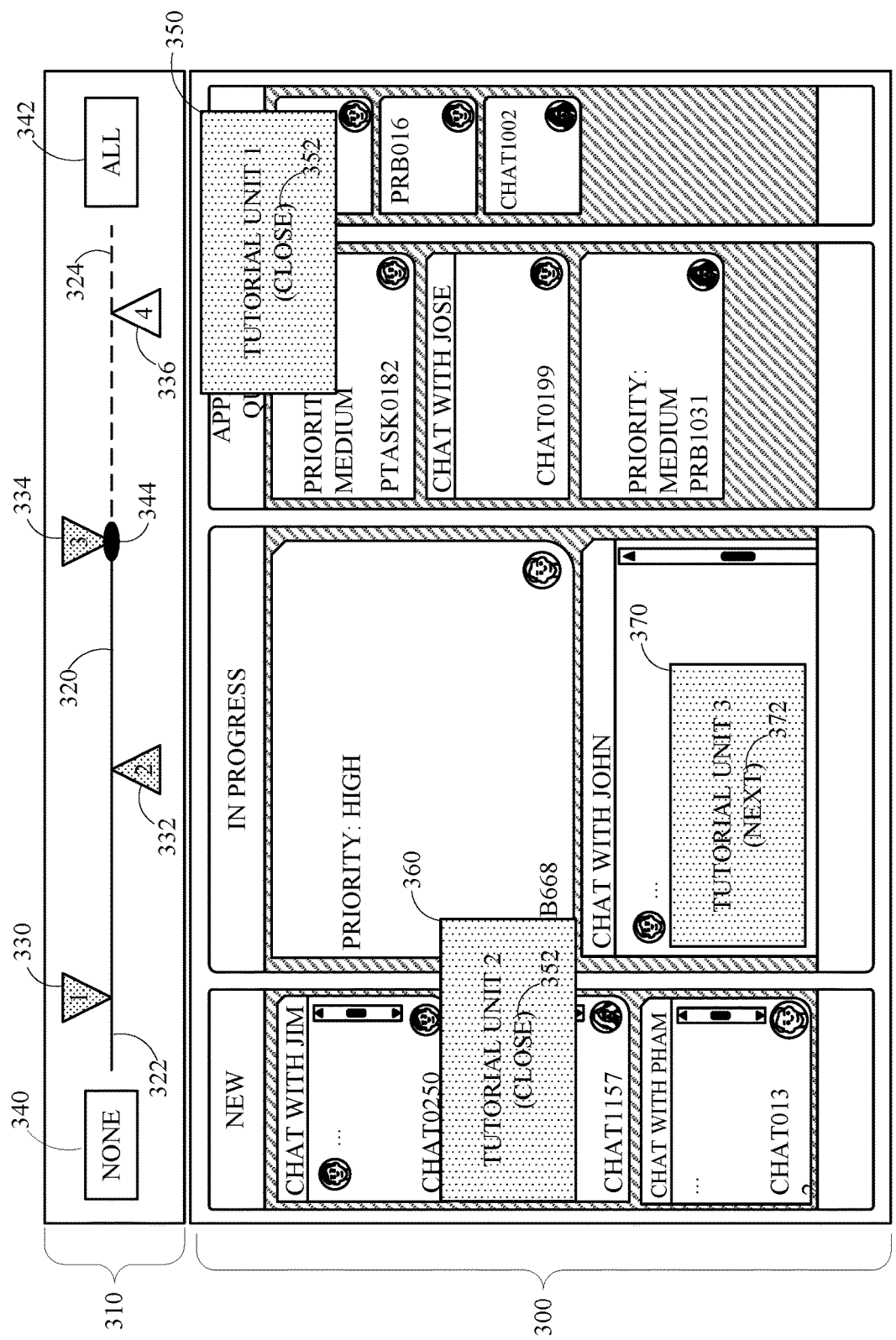

FIG. 3D is a pictorial diagram that shows another example of a timeline tutorial chooser in accordance with this disclosure. The example shown in FIG. 3D is similar to the example shown in FIG. 3C, except as described herein. In FIG. 3D, the third tutorial unit 370 is included in the output for display, the third tutorial unit indicator 334 indicates that the third tutorial unit 370 is included in the output for display, the position of the slider control 344 indicates that the third tutorial unit 370 is included in the output for display, the first portion 322 of the tutorial timeline 320, which is shown as a thick solid line, indicates that the third tutorial unit 370 is included in the output for display, and the control 362 included in the second tutorial unit 360 is a "Close" control. The third tutorial unit 370 includes a "Next" control 372.

Figure 3E:
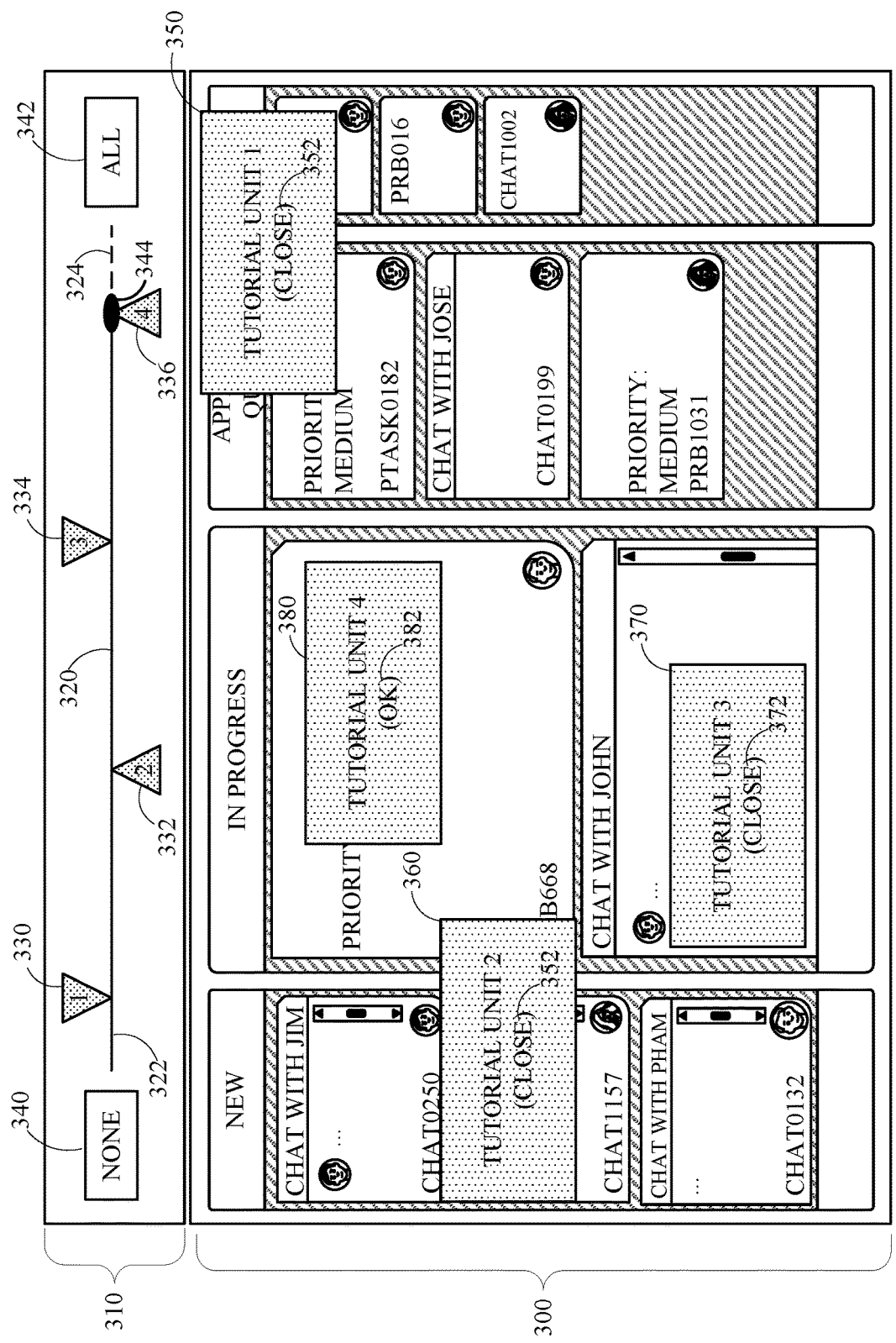

FIG. 3E is a pictorial diagram that shows another example of a timeline tutorial chooser in accordance with this disclosure. The example shown in FIG. 3E is similar to the example shown in FIG. 3D, except as described herein. In FIG. 3E, the fourth tutorial unit 380 is included in the output for display, the fourth tutorial unit indicator 336 indicates that the fourth tutorial unit 380 is included in the output for display, the position of the slider control 344 indicates that the fourth tutorial unit 380 is included in the output for display, the first portion 322 of the tutorial timeline 320, which is shown as a thick solid line, indicates that the fourth tutorial unit 380 is included in the output for display, and the control 372 included in the third tutorial unit 370 is a "Close" control. The fourth tutorial unit 380 includes an "OK" control 382.

Figure 3F:
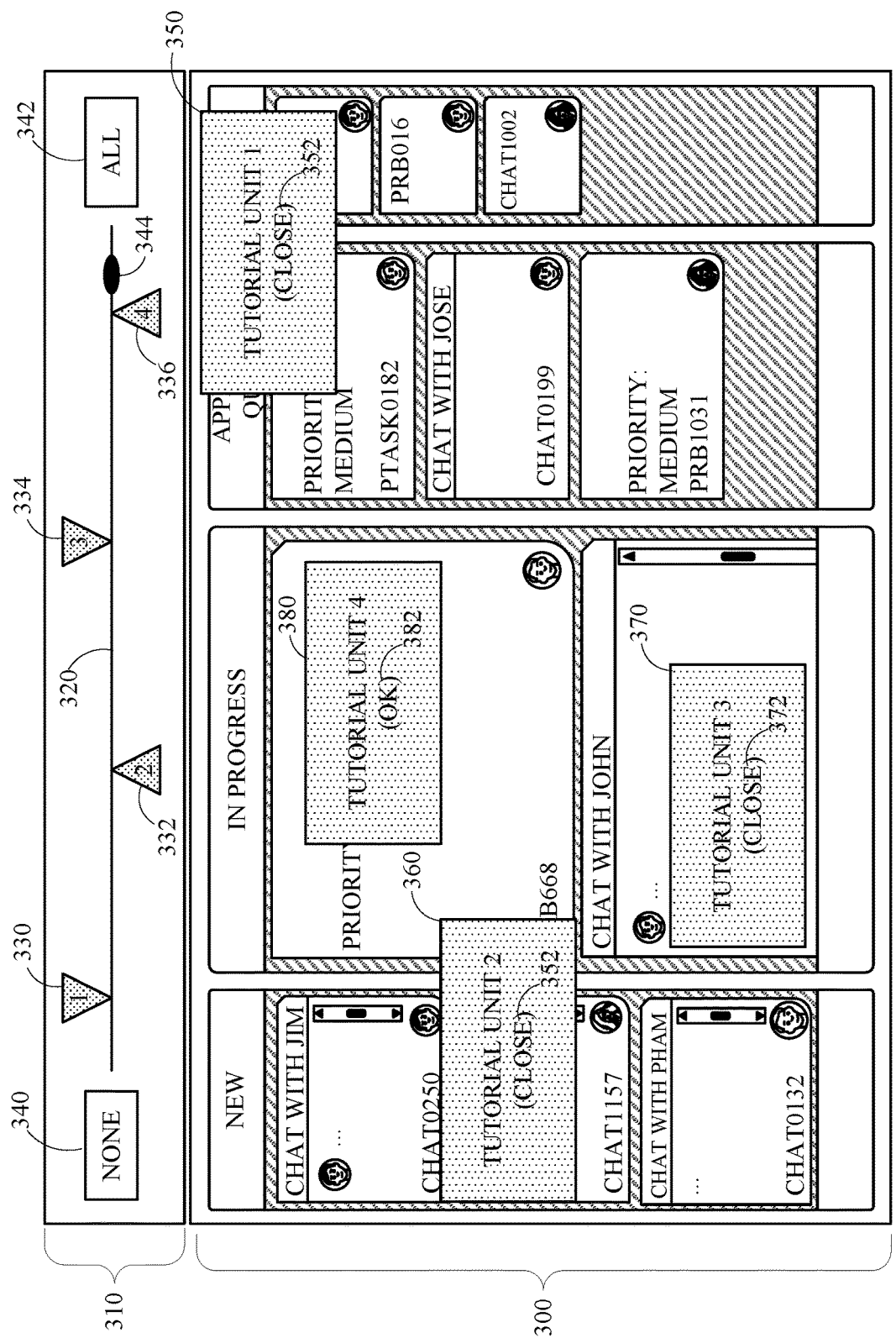

FIG. 3F is a pictorial diagram that shows another example of a timeline tutorial chooser in accordance with this disclosure. The example shown in FIG. 3F is similar to the example shown in FIG. 3E, except as described herein. In FIG. 3F, the tutorial timeline 320 is shown as a thick solid line, and indicates that all of the tutorial units 350, 360, 370, 380 are included in the output for display.

In some aspects, multiple tutorial units may be included in the output for display in response to input, such as user input. For example, the first tutorial unit 350, and the second tutorial unit 360, may be included in the output for display in response to user input dragging the slider control 344 from the left end of the tutorial timeline 320, as shown in FIG. 3A, to a position along the tutorial timeline 320 corresponding to the second tutorial unit indicator 332, as shown in FIG. 3C.

In another example, the first tutorial unit 350, the second tutorial unit 360, and the third tutorial unit 370, may be included in the output for display in response to user input dragging the slider control 344 from the left end of the tutorial timeline 320, as shown in FIG. 3A, or from a position along the tutorial timeline 320 corresponding to the first tutorial unit indicator 332, as shown in FIG. 3C, to a position along the tutorial timeline 320 corresponding to the third tutorial unit indicator 334, as shown in FIG. 3D.

In another example, the first tutorial unit 350, the second tutorial unit 360, the third tutorial unit 370, and the forth tutorial unit 380, may be included in the output for display in response to user input dragging the slider control 344 from the left end of the tutorial timeline 320, as shown in FIG. 3A, from a position along the tutorial timeline 320 corresponding to the first tutorial unit indicator 332, as shown in FIG. 3C, or from a position along the tutorial timeline 320 corresponding to the second tutorial unit indicator 334, as shown in FIG. 3D, to a position along the tutorial timeline 320 corresponding to the fourth tutorial unit indicator 336, as shown in FIG. 3D.

In another example, the first tutorial unit 350, the second tutorial unit 360, the third tutorial unit 370, and the forth tutorial unit 380, may be included in the output for display in response to user input clicking or tapping on the "All" control 342.

In some aspects, a tutorial unit may be included directly, in response to input, such as user input, selecting the tutorial unit. For example, a tutorial unit may be included in response to user input clicking on the tutorial stage indicator representing the tutorial unit as shown in FIG. 3G.

Figure 3G:
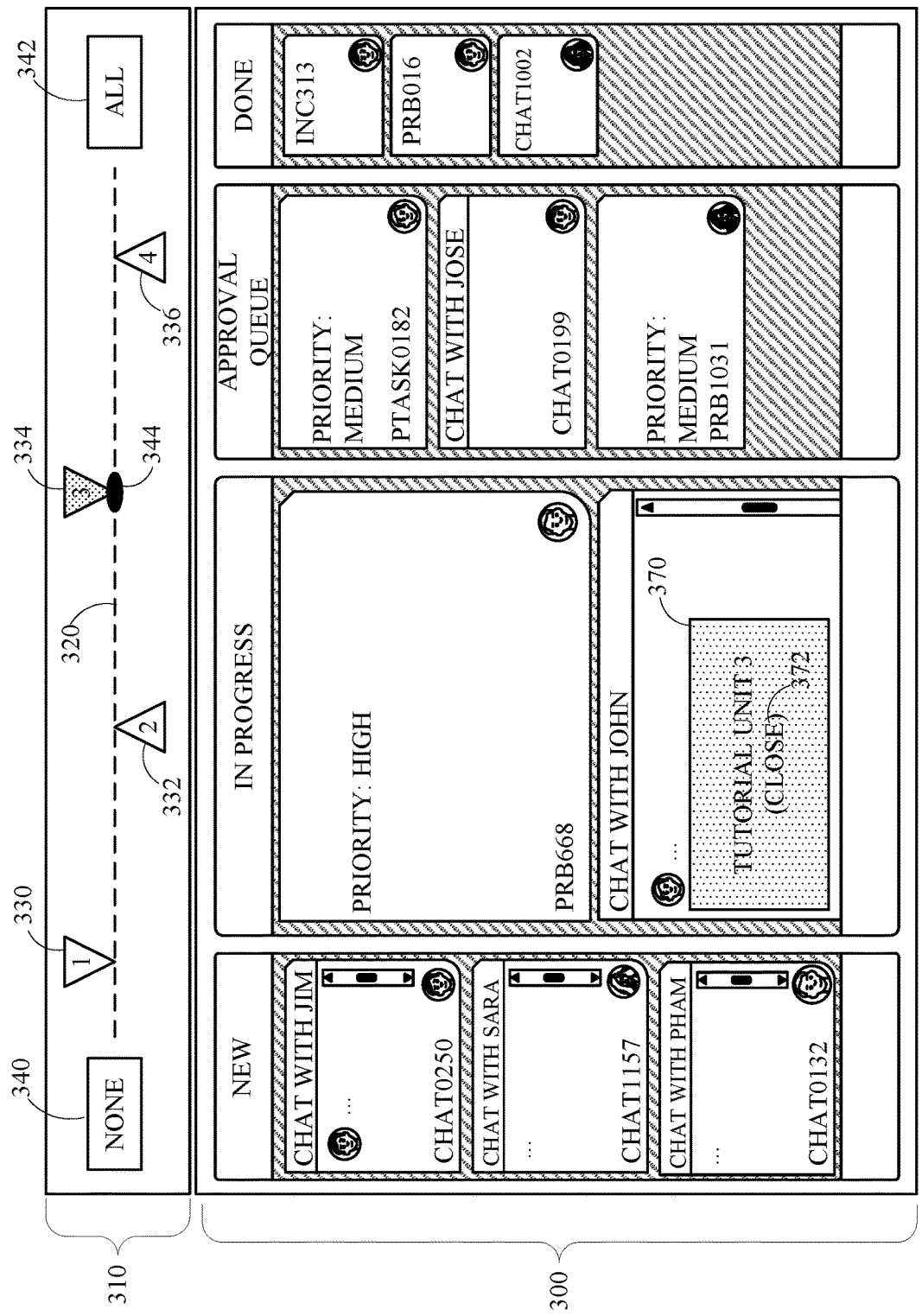

FIG. 3G is a pictorial diagram that shows another example of a timeline tutorial chooser in accordance with this disclosure. The example shown in FIG. 3G is similar to the example shown in FIG. 3A, except as described herein. In FIG. 3G, the third tutorial unit 370 is included in the output for display, the third tutorial unit indicator 334 indicates that the third tutorial unit 370 is included in the output for display, and the position of the slider control 344 indicates that the third tutorial unit 370 is included in the output for display. The tutorial timeline 320 is shown as a broken line to indicate that the included tutorial unit 370 was included directly. The other tutorial units 350, 360, 380 may be omitted as shown. The third tutorial unit 370 includes a "Close" control 372.

Although FIG. 3G shows one example of directly including a tutorial unit in the output for display, any one or more tutorial units may be directly included in, or omitted from, the output for display in response to user input selecting or deselecting the corresponding tutorial stage identifiers respectively.

Figure 4:
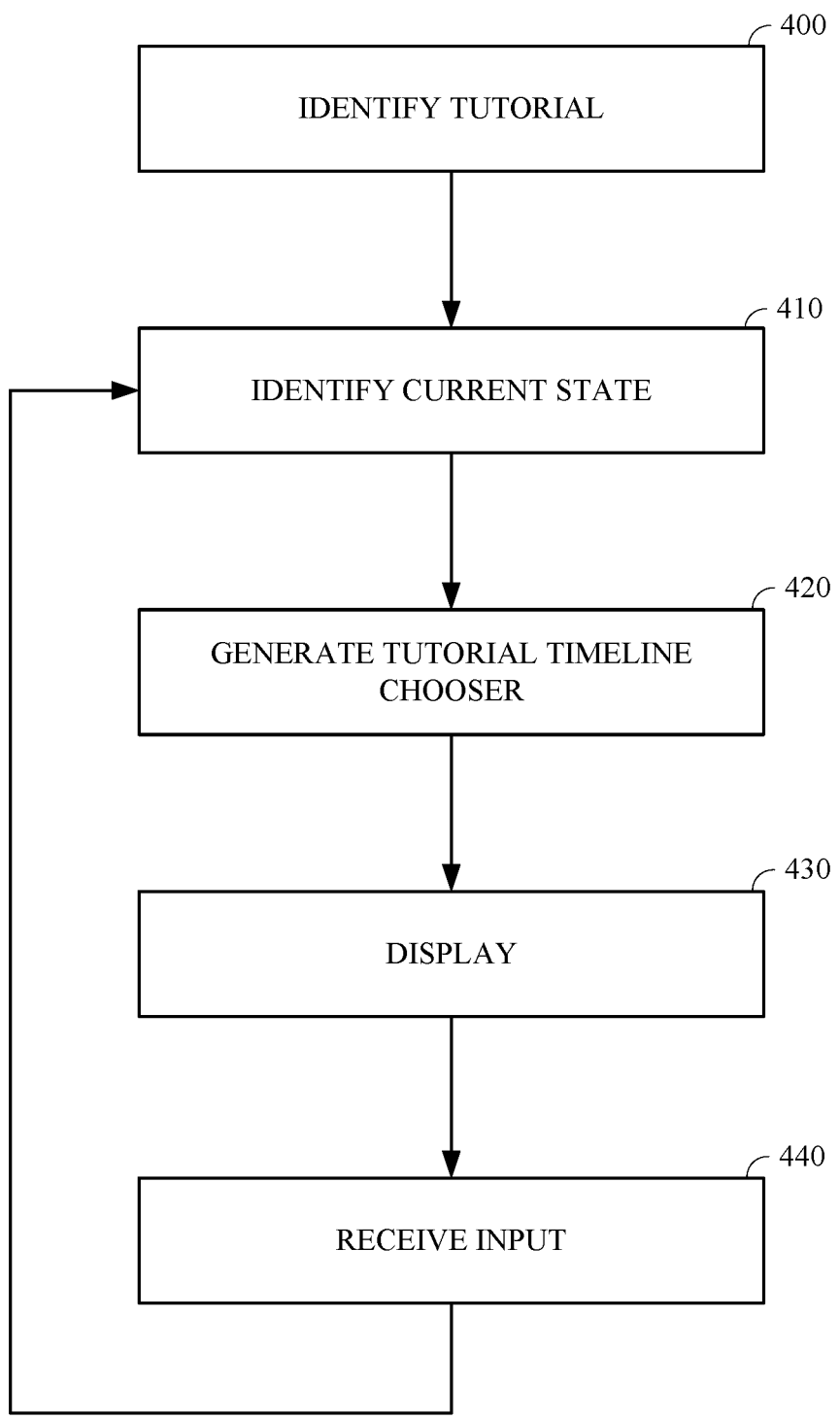
FIG. 4 is a flowchart of an example of generating a timeline tutorial chooser in accordance with this disclosure.

FIG. 4 is a flowchart of an example of generating a timeline tutorial chooser in accordance with this disclosure. Generating a timeline tutorial chooser may be implemented in a computing system, such as the cloud computing system 100 shown in FIG. 1. For example, generating a timeline tutorial chooser may be implemented on a server, such as one or more of the servers 122 shown in FIG. 1, a computing device, such as a client 112 shown in FIG. 1, or by a combination thereof communicating via a network, such as the network 130 shown in FIG. 1. Generating a timeline tutorial chooser may include identifying a tutorial at 400, identifying a current state of the tutorial timeline chooser at 410, generating or updating the tutorial timeline chooser at 420, displaying the tutorial at 430, receiving input at 440, or a combination thereof.

A tutorial may be identified at 400. In some aspects, a tutorial may be identified in response to input, such as user input. For example, a user of a visual task board may select a help or tutorial feature of the visual task board, and a tutorial may be identified in response. In some aspects, identifying a tutorial may include reading information describing the tutorial from one or more databases, one or more files, or a combination thereof.

Identifying the tutorial may include identifying one or more tutorial units, such as the tutorial units 350, 360, 370, 380 shown in FIGS. 3B-3G. In some aspects, identifying the tutorial units may include determining a cardinality of the set of tutorial units. For example, in FIGS. 3A-3G, the tutorial includes a set of four tutorial units. In some aspects, the tutorial units, and the cardinality thereof, may be identified based on expressly defined tutorial information, such as information in a database record, configuration file, or application instruction indicating a cardinality of the set of tutorial units. In some aspects, the tutorial units may be identified based on implicit information. For example, database records, configuration files, or application instructions may include information describing the tutorial units, and the cardinality of the set of tutorial units may be generated by counting the tutorial units described.

A current state of the tutorial timeline chooser may be identified at 410. The current state of the tutorial timeline chooser may be identified in response to input, such as user input. For example, identifying the current state may include determining that tutorial timeline chooser is in an initial state in response to user input requesting the tutorial. Identifying the current state of the tutorial timeline chooser may include identifying tutorial units included and omitted from the output for display. The current state of the tutorial timeline chooser may indicate a state of the tutorial timeline chooser immediately before the input.

A tutorial timeline chooser may be generated or updated at 420 for the tutorial identified at 400 based on the current state identified at 410. Generating or updating a tutorial timeline chooser may include generating or updating a tutorial timeline representing the tutorial as a continuum, such as the tutorial timeline 320 shown in FIGS. 3A-3G. Generating or updating a tutorial timeline chooser may include generating or updating tutorial segment indicators representing the tutorial units, such as the tutorial segment indicators 330-336 shown in FIGS. 3A-3G. Generating or updating a tutorial timeline chooser may include generating or updating tutorial controls, such as the tutorial controls 340-344 shown in FIGS. 3A-3G.

Generating or updating the tutorial timeline chooser may include determining whether to display one or more of the tutorial units. For example, the tutorial timeline chooser may be generated or updated in response to user input requesting the tutorial, the first tutorial unit in the sequence of tutorial units for the tutorial may be generated, and other tutorial units may be omitted. In another example, the tutorial timeline chooser may be displayed in response to user input interacting with the tutorial, and the tutorial units to include in, or omit from, the output for display may be determined in response to the user input and the current state of the tutorial.

In some aspects, generating or updating the tutorial may include determining characteristics for displaying the tutorial timeline. For example, the tutorial may be generated or updated in response to user input requesting the tutorial, the tutorial timeline may include a first portion indicating a completed or shown portion of the tutorial, such as the portion 322 on the left end of the tutorial timeline in FIGS. 3B-3E or the tutorial timeline in FIG. 3F, and the tutorial timeline may include a second portion indicating an incomplete or omitted portion of the tutorial, such as the tutorial timeline shown in FIGS. 3A and 3G, or the tutorial timeline portion 324 shown in FIGS. 3B-3E.

In some aspects, generating or updating the tutorial may include positioning the tutorial segment indicators, determining characteristics for displaying the tutorial segment indicators, or both. Generating or updating the characteristics may include determining whether to include the tutorial unit corresponding to each tutorial segment indicator in the output for display, and generating or updating the tutorial segment indicators such that the tutorial indicators indicate whether the corresponding tutorial units are included in the output for display. For example, the tutorial may be generated or updated in response to user input requesting the tutorial, the tutorial may include the first tutorial unit, the first tutorial segment indicator may be generated or updated such that a characteristic of the first tutorial segment indicator, such as a background of the first tutorial segment indicator, indicates that the first tutorial unit is included in the output for display, and the other segment indicators may be generated or updated such that a characteristic of the other tutorial segment indicators, such as a background of each tutorial segment indicator, indicates that the corresponding tutorial units are omitted from the output for display, as shown in FIG. 3B.

In some aspects, generating or updating the tutorial may include determining characteristics for displaying the tutorial controls. For example, the tutorial may be generated or updated in response to user input requesting the tutorial, the tutorial may include the first tutorial unit, the "None" control may be included to the left of the tutorial timeline, the "All" control may be included to the right of the tutorial timeline, and the slider control may be included along the tutorial timeline at a position corresponding to the first tutorial segment indicator, as shown in FIG. 3B. In another example, the tutorial may be generated or updated in response to user input selecting the "All" control, the tutorial may include the first tutorial unit, the second tutorial unit, the third tutorial unit, the fourth tutorial unit, the "None" control may be included to the left of the tutorial timeline, the "All" control may be included to the right of the tutorial timeline, a characteristic of the "All" control, such as a background color, may indicate that the all control is disabled, and the slider control may be included along the tutorial timeline near the right end of the tutorial timeline, as shown in FIG. 3F.

In some aspects, generating or updating the tutorial may include determining whether to display one or more of the tutorial units, and may include determining characteristics for displaying the tutorial units. For example, the tutorial may be generated or updated in response to user input requesting the tutorial, the first tutorial unit may be included in the output for display, a "Next" control may be included in the first tutorial unit, and the other tutorial units may be omitted from the output for display, as shown in FIG. 3B.

In some aspects, generating or updating the tutorial at 430 may include determining characteristics for displaying the tutorial based on a combination of input, such as user input, and a current state of the tutorial timeline chooser. For example, the tutorial may be generated or updated in response to user input requesting the tutorial, and the current state of the tutorial timeline chooser, which may be the state immediately prior to the input, may indicate an initial state. In another example, the current state of the tutorial may indicate a state as shown in FIG. 3B, and the tutorial may be generated or updated in response to user input selecting the "Next" control, as shown in FIG. 3C. In another example, the current state of the tutorial may indicate a state as shown FIG. 3A, and the tutorial may be generated or updated in response to user input selecting the third tutorial segment indicator 334, as shown in FIG. 3G.

The tutorial identified at 400 may be displayed at 430, which may include displaying the tutorial timeline choose generated or updating at 420. Displaying the tutorial may include providing, via an output module, the generated or updated tutorial timeline chooser in an output for display, storing the output for display, transmitting the output for display, displaying the output, or a combination thereof.

Input may be received at 440, and the tutorial may be displayed, or updated in response, at 410-430. For example, the input may indicate the selection of one of the tutorial segment indicators, the selection of one of the tutorial controls, sliding of the tutorial slider, or the selection of a control included in a tutorial unit. Although not shown separately, the tutorial timeline chooser may be terminated in response to input, such as user input closing or completing the tutorial.

All or a portion of aspects of the invention described herein can be implemented using a general purpose computer/processor with a computer program that, when executed, carries out any of the respective techniques, algorithms and/or instructions described herein. In addition, or alternatively, for example, a special purpose computer/processor can be utilized which can contain specialized hardware for carrying out any of the techniques, algorithms, or instructions described herein.

The implementations of computing devices as described herein (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination.

For example, one or more computing devices can include an ASIC or programmable logic array such as a field-programmable gate array (FPGA) configured as a special-purpose processor to perform one or more of the operations or operations described or claimed herein. An example FPGA can include a collection of logic blocks and random access memory (RAM) blocks that can be individually configured and/or configurably interconnected in order to cause the FPGA to perform certain functions. Certain FPGA's may contain other general or special purpose blocks as well. An example FPGA can be programmed based on a hardware definition language (HDL) design, such as VHSIC Hardware Description Language or Verilog.

The aspects herein may be described in terms of functional block components and various processing operations. Such functional blocks may be realized by any number of hardware and/or software components that perform the specified functions. For example, the described aspects may employ various integrated circuit components, e.g., memory elements, processing elements, logic elements, look-up tables, and the like, which may carry out a variety of functions under the control of one or more microprocessors or other control devices. Similarly, where the elements of the described aspects are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the aspects of the invention could employ any number of conventional techniques for electronics configuration, signal processing and/or control, data processing and the like. The words "mechanism" and "element" are used broadly and are not limited to mechanical or physical embodiments or aspects, but can include software routines in conjunction with processors, etc.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or a semiconductor device. Other suitable mediums are also available. Such computer-usable or computer-readable media can be referred to as non-transitory memory or media, and may include RAM or other volatile memory or storage devices that may change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

Any of the individual or combined functions described herein as being performed as examples of the invention may be implemented using machine readable instructions in the form of code for operation of any or any combination of the aforementioned computational hardware. Computational code may be implemented in the form of one or more modules by which individual or combined functions can be performed as a computational tool, the input and output data of each module being passed to/from one or more further module during operation of the methods and systems described herein.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. In other words, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment, aspect, or implementation unless described as such.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent example functional relationships and/or physical or logical couplings between the various elements. Many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the operations of all methods described herein are performable in any suitable order unless otherwise indicated herein or otherwise clearly contradicted by context. The use of any and all examples, or example language (e.g., "such as") provided herein, is intended merely to better illuminate the invention and does not pose a limitation on the scope of the invention unless otherwise claimed.

All references, including publications, patent applications, and patents, cited herein are hereby incorporated by reference to the same extent as if each reference were individually and specifically indicated as incorporated by reference and were set forth in its entirety herein.

The above-described aspects have been described in order to allow easy understanding of the present invention and do not limit the present invention. To the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A system for operating a window region of a graphical user interface (GUI) associated with a computer-based tutorial system, comprising:
   a processor; and
   a memory having instructions stored thereon that, when executed by the processor, cause the processor to:
      generate the GUI for display on a display device, the GUI comprising a tutorial timeline chooser and a context portion, wherein the tutorial timeline chooser includes a plurality of tutorial segment indicators each corresponding to a respective tutorial of a plurality of tutorials, and the context portion comprises a first tutorial window of a plurality of tutorial windows for displaying a first tutorial of the plurality of tutorials and a first control associated with the first tutorial window, wherein the first control is configured to request display of a second tutorial window when selected, wherein the second tutorial window is next in a sequence of the plurality of the tutorial windows;
      receive a user selection of a tutorial segment indicator of the plurality of the tutorial segment indicators, wherein the tutorial segment indicator corresponds to the second tutorial window; and
      update the GUI in response to receiving the user selection of the tutorial segment indicator, by:
         updating the first control associated with the first tutorial window, wherein the updated first control is configured to close the first tutorial window when selected;
         displaying the second tutorial window of the plurality of tutorial windows, wherein the second tutorial window corresponds with the selected tutorial segment indicator;
         displaying a second control associated with the second tutorial window, wherein the second control is configured to request display of a third tutorial window when selected, wherein the third tutorial window is next in the sequence of the plurality of the tutorial windows; and
         updating the tutorial timeline chooser to reflect the updates to the context portion.

2. The system of claim 1, wherein the context portion comprises a visual task board, and wherein the first tutorial window is superimposed over a portion of the visual task board.

3. The system of claim 1, wherein the instructions, when executed by the processor, cause the processor to update the tutorial timeline chooser by changing a visual characteristic of the tutorial segment indicator corresponding to the second tutorial window to indicate that the second tutorial window is included in the context portion.

4. The system of claim 1, wherein the instructions, when executed by the processor, cause the processor to update the tutorial timeline chooser by changing a visual characteristic of a portion of the tutorial timeline chooser to reflect the updates to the context portion.

5. The system of claim 1, wherein the instructions, when executed by the processor, cause the processor to:
   receive a user selection of an additional tutorial segment indicator of the plurality of the tutorial segment indicators, wherein the additional tutorial segment indicator corresponds to a third tutorial window of the plurality of the tutorial windows; and
   update the GUI in response to receiving the user selection of the additional tutorial segment indicator, by:
      updating the second control associated with the second tutorial window, wherein the updated second control is configured to close the second tutorial window when selected;
      displaying the third tutorial window;
         displaying a third control associated with the third tutorial window, wherein the third control is configured to request display of a fourth tutorial window when selected, wherein the fourth tutorial window is next in the sequence of the plurality of the tutorial windows; and
         updating the tutorial timeline chooser to reflect the updates to the context portion in response to receiving the user selection of the additional tutorial segment indicator.

6. The system of claim 1, wherein the instructions, when executed by the processor, cause the processor to:
   receive a user selection of an additional tutorial segment indicator of the plurality of the tutorial segment indicators, wherein the additional tutorial segment indicator corresponds to a fourth tutorial window of the plurality of the tutorial windows; and
   update the GUI in response to receiving the user selection of the additional tutorial segment indicator, by:
      updating the second control associated with the second tutorial window, wherein the updated second control is configured to close the second tutorial window when selected;
   displaying the fourth tutorial window; and
   updating the tutorial timeline chooser to reflect the updates to the GUI.

7. A tangible, non-transitory, machine-readable medium, comprising instructions that, when executed by one or more processors, cause the one or more processors to:
   generate a graphical user interface (GUI) for display on a display device, the GUI comprising a first tutorial window of a sequence of tutorial windows and a first control associated with the first tutorial window, wherein the first control is configured to request display of a second tutorial window when selected, wherein the second tutorial window is next in the sequence of tutorial windows, and wherein each tutorial window in the sequence of the tutorial windows provides information associated with a corresponding tutorial;
   receive a user selection of the first control; and
   update the GUI in response to receiving the user selection of the first control, by:
      updating the first control, wherein the updated first control is configured to close the first tutorial window when selected;
      displaying the second tutorial window of the sequence of tutorial windows; and displaying a second control configured to request display of a third tutorial window when selected, wherein the third tutorial window is next in the sequence of tutorial windows.

8. The tangible, non-transitory, machine-readable medium of claim 7, wherein the GUI comprises a visual task board, and wherein the first tutorial window and the second tutorial window are superimposed over respective portions of the visual task board.

9. The tangible, non-transitory, machine-readable medium of claim 7, comprising instructions that, when executed by the one or more processors, cause the one or more processors to:
receive a user selection of the updated first control; and
update the GUI in response to the received user selection of the first control, by closing the first tutorial and removing the first tutorial window from the GUI.

10. The tangible, non-transitory, machine-readable medium of claim 7, comprising instructions that, when executed by the one or more processors, cause the one or more processors to:
receive a user selection of the second control;
update the GUI in response to receiving the user selection of the second control, by:
updating the second control, wherein the updated second control is configured to close the second tutorial window when selected;
displaying the third tutorial window of the sequence of tutorial windows; and
displaying a third control configured to request display of a fourth tutorial window when selected, wherein the fourth tutorial window is next in of the sequence of tutorial windows.

11. The tangible, non-transitory, machine-readable medium of claim 10, comprising instructions that, when executed by the one or more processors, cause the one or more processors to:
receive a user selection of the updated first control; and
update the GUI in response to the received user selection of the updated first control, by closing the first tutorial window and removing the first tutorial window from the GUI.

12. The tangible, non-transitory, machine-readable medium of claim 7, wherein the GUI comprises a tutorial timeline chooser that includes a plurality of tutorial segment indicators, wherein each tutorial window of the sequence of tutorial windows corresponds to a respective tutorial segment indicator of the plurality of the tutorial segment indicators.

13. The tangible, non-transitory, machine-readable medium of claim 12, comprising instructions that, when executed by the one or more processors, cause the one or more processors to update the tutorial timeline chooser to reflect the updates to the GUI in response to the received user selection of the first control.

14. A system for operating a window region of a graphical user interface (GUI) associated with a computer-based system, comprising:
a processor; and
a memory having instructions stored thereon that, when executed by the processor, cause the processor to:
generate the GUI for display on a display device, the GUI comprising a first window of a sequence of windows and a first control associated with the first window, wherein the first control is configured to request display of a second window when selected, wherein the second window is next in of the sequence of the windows, and wherein each window in the sequence of the windows provides information related to a given subject;
receive a user selection of the first control; and
update the GUI in response to receiving the user selection of the first control, by:
updating the first control, wherein the updated first control is configured to close the first window when selected;
displaying the second window of the sequence of windows; and
displaying a second control configured to request display of a third window when selected, wherein the third window is next in of the sequence of windows.

15. The system of claim 14, wherein the GUI comprises a visual task board, and wherein the first window and the second window are superimposed over respective portions of the visual task board.

16. The system of claim 14, wherein the instructions, when executed by the processor, cause the processor to:
receive a user selection of the updated first control; and
update the GUI in response to receiving the user selection of the updated first control, by closing the first window and removing the first window from the GUI.

17. The system of claim 14, wherein the instructions, when executed by the processor, cause the processor to:
receive a user selection of the second control; and
update the GUI in response to receiving the user selection of the second control, by:
updating the second control, wherein the updated second control is configured to close the second window when selected;
displaying the third window of the sequence of windows; and
displaying a third control configured to request display of a fourth window when selected, wherein the fourth window is next in et the sequence of windows.

18. The system of claim 17, wherein the instructions, when executed by the processor, cause the processor to:
receive a user selection of the updated first control; and
update the GUI in response to receiving the user selection of the updated first control, by closing the first window and removing the first window from the GUI.

19. The system of claim 14, wherein the GUI comprises a timeline chooser that includes a plurality of segment indicators, wherein each window of the sequence of windows corresponds to a respective segment indicator of the plurality of the segment indicators.

20. The system of claim 19, wherein the instructions, when executed by the processor, cause the processor to update the timeline chooser to reflect the updates to the GUI in response to receiving the user selection of the first control.

* * * * *